US012697899B2

(12) United States Patent (10) Patent No.: US 12,697,899 B2
Höckenström et al. (45) Date of Patent: Aug. 4, 2026

(54) BALANCING CHARGE LEVEL OF BATTERIES

(71) Applicant: POLESTAR PERFORMANCE AB, Gothenburg (SE)

(72) Inventors: Anders Höckenström, Gothenburg (SE); Hans Pehrson, Torslanda (SE); Jongseok Moon, Västra Frölunda (SE); Erik Ragnerius, Västra Frölunda (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 952 days.

(21) Appl. No.: 17/921,574

(22) PCT Filed: Jan. 18, 2021

(86) PCT No.: PCT/EP2021/050956
§ 371 (c)(1),
(2) Date: Oct. 26, 2022

(87) PCT Pub. No.: WO2021/156044
PCT Pub. Date: Aug. 12, 2021

(65) Prior Publication Data
US 2023/0166634 A1 Jun. 1, 2023

(30) Foreign Application Priority Data

Feb. 4, 2020 (EP) ..................................... 20155356

(51) Int. Cl.
*H02J 7/00* (2026.01)
*B60K 17/356* (2006.01)
(Continued)

(52) U.S. Cl.
CPC ............ *B60L 58/22* (2019.02); *B60K 17/356* (2013.01); *B60L 7/14* (2013.01); *B60L 50/60* (2019.02);
(Continued)

(58) Field of Classification Search
CPC .......... B60L 58/22; B60L 50/60; H02J 7/0048
See application file for complete search history.

(56) References Cited

U.S. PATENT DOCUMENTS

2003/0122512 A1 7/2003 Auerbach
2018/0105060 A1 4/2018 Mcquillen et al.
(Continued)

FOREIGN PATENT DOCUMENTS

CN 101232193 A 7/2008
CN 107785961 A 3/2018
(Continued)

OTHER PUBLICATIONS

CN202180012751.3, "Office Action", Jan. 24, 2025, 9 pages.
(Continued)

*Primary Examiner* — Robert Grant
(74) *Attorney, Agent, or Firm* — Kilpatrick Townsend & Stockton LLP

(57) ABSTRACT

The present disclosure relates to a dual battery system (1) comprising a first battery (B1) and a second battery (B2), for balancing charge level of the first battery and the second battery, the dual battery system being adapted for powering propulsion of an electric vehicle (3) comprising a first electric motor (E1) coupled in driving relationship with one or more rear wheels of the electric vehicle and a second electric motor (E2) coupled in driving relationship with one or more front wheels of the electric vehicle. The first battery is adapted to provide electric power for driving the first electric motor and the second battery is adapted to provide electric power for driving the second electric motor. The dual battery system obtains (100) at least one of data or information of a predetermined and/or imminent charging event of the electric vehicle. The dual battery system furthermore obtains (200) at least one of data or information of charge level of the first battery and second battery respec- (Continued)

tively. Moreover the dual battery system selects (300), when the charge level of the first battery and the second battery are unbalanced, a driving scenario which comprises charging and/or discharging of at least one of the first battery and the second battery, the driving scenario balancing the charge level of the first battery and the second battery prior to arriving at the predetermined and/or imminent charging event. The disclosure also relates to a dual battery system in accordance with the foregoing, and an electric vehicle comprising such a dual battery system.

20 Claims, 3 Drawing Sheets

(51) Int. Cl.
| | |
|---|---|
| *B60L 7/14* | (2006.01) |
| *B60L 50/60* | (2019.01) |
| *B60L 58/12* | (2019.01) |
| *B60L 58/22* | (2019.01) |
| *H01M 10/44* | (2006.01) |
| *H01M 10/46* | (2006.01) |
| *H01M 10/48* | (2006.01) |
| *H02J 7/82* | (2026.01) |
| *B60K 23/08* | (2006.01) |
| *H01M 10/42* | (2006.01) |

(52) U.S. Cl.
CPC ........... *B60L 58/12* (2019.02); *H01M 10/441* (2013.01); *H01M 10/46* (2013.01); *H01M 10/482* (2013.01); *H02J 7/82* (2026.01); *H02J 7/855* (2026.01); *B60K 23/08* (2013.01); *B60L 2250/00* (2013.01); *H01M 2010/4278* (2013.01); *H01M 2220/20* (2013.01)

(56) References Cited

U.S. PATENT DOCUMENTS

| | | | |
|---|---|---|---|
| 2019/0176729 A1 | 6/2019 | Link et al. | |
| 2020/0055404 A1 | 2/2020 | Conlon et al. | |

FOREIGN PATENT DOCUMENTS

| | | | | |
|---|---|---|---|---|
| CN | 109937153 A | | 6/2019 | |
| CN | 110271451 A | | 9/2019 | |
| DE | 102017212496 A1 | | 1/2019 | |
| EP | 3323664 A1 | * | 5/2018 | .......... B60L 15/2045 |
| GB | 2550955 | * | 2/2016 | |
| GB | 2550955 A | | 12/2017 | |
| WO | 2017207997 A1 | | 12/2017 | |
| WO | 2018090853 A1 | | 5/2018 | |

OTHER PUBLICATIONS

CN202180012751.3, "Office Action", Jun. 9, 2025, 7 pages.
EP20155356.7 , "Extended European Search Report", Jul. 16, 2020, 11 pages.
PCT/EP2021/050956 , "International Search Report and Written Opinion", Aug. 4, 2021, 13 pages.

* cited by examiner

BALANCING CHARGE LEVEL OF BATTERIES

The present application is a National Phase Entry of International Patent Application No. PCT/EP2021/050956, filed on Jan. 18, 2021, which claims priority to EP Application No. 20155356.7, filed on Feb. 4, 2020, the disclosures of which are incorporated by reference herein.

TECHNICAL FIELD

The disclosed subject matter relates to balancing charge level of a first battery and a second battery of a dual battery system.

BACKGROUND

Battery powered electric vehicles are starting to play a significant role in the automotive industry, one of the reasons being a desire to decrease carbon emissions associated with the use of internal combustion engine powered transportation.

Accompanying this development, there is an increased demand on improved battery capacity of the battery powered electric vehicles, enabling improved performance thereof. Increased battery capacity may, however, have a negative effect on battery charging capabilities; in particular, the time required for charging of the electric vehicle may increase.

For example, currently available fast charging stations commonly support a charging voltage of 400 V. As a means to provide even faster charging of electric vehicles and/or to meet increased battery capacities, charging stations supporting a charging voltage of 800 V are suggested, and to some extent available. Existing battery powered electric vehicles typically have battery systems supporting an operating voltage of 400 V, and hence different solutions may be provided in order for such battery systems to be chargeable at a selectable first or second charging voltage, for example at a charging voltage of 400 V or 800 V.

It is known to utilize a dual battery system comprising two batteries for powering propulsion of an electric vehicle, which two batteries may be electrically connectable in parallel or in series, by means of a switch arrangement. This enables the electric vehicle battery system to operate and/or charge at a first voltage, e.g. 400 V, and to operate and/or charge at a second voltage, higher than the first voltage, e.g. 800 V. In this way, the battery powered electric vehicle may be adapted to be charged at a selectable first or second charging voltage, without the use of, for instance, a voltage converter or transformer.

However, for a dual battery system as described above, configured to switch between parallel connection and series connection of the two batteries, inter alia to enable a first or a second charging voltage, charging capabilities greatly benefit from the two batteries being balanced in terms of charge level.

Thus, for such a dual battery system used for powering propulsion of an electric vehicle, in order to improve charging events thereof, there is a need for improved balancing strategies.

SUMMARY

It is therefore an object of embodiments herein to provide an approach that overcomes or ameliorates at least one of the disadvantages of the prior art, or to provide a useful alternative.

The object above may be achieved by the subject matter disclosed herein. Embodiments are set forth in the appended claims, in the following description and in the drawings.

The disclosed subject matter relates to a method performed by a dual battery system comprising a first battery and a second battery, for balancing charge level of the first battery and the second battery. The dual battery system is adapted for powering propulsion of an electric vehicle comprising a first electric motor coupled in driving relationship with one or more rear wheels of the electric vehicle and a second electric motor coupled in driving relationship with one or more front wheels of the electric vehicle. The first battery is adapted to provide electric power for driving the first electric motor and the second battery is adapted to provide electric power for driving the second electric motor. The method comprises:

obtaining at least one of data or information of a predetermined and/or imminent charging event of the electric vehicle, obtaining at least one of data or information of charge level of the first battery and the second battery respectively, and selecting, when the charge level of the first battery and the second battery are unbalanced, a driving scenario which comprises charging and/or discharging of at least one of the first battery and the second battery, the driving scenario balancing the charge level of the first battery and second battery prior to arriving at the predetermined and/or imminent charging event.

The disclosed subject matter further relates to a dual battery system comprising a first battery and a second battery, for balancing charge level of the first battery and the second battery. The dual battery system is adapted for powering propulsion of an electric vehicle comprising a first electric motor coupled in driving relationship with one or more rear wheels of the electric vehicle and a second electric motor coupled in driving relationship with one or more front wheels of the electric vehicle. The first battery is adapted to provide electric power for driving the first electric motor and the second battery is adapted to provide electric power for driving the second electric motor. The dual battery system is adapted to:

obtain at least one of data or information of a predetermined and/or imminent charging event of the electric vehicle, obtain at least one of data or information of charge level of the first battery and the second battery respectively, and selecting, when the charge level of the first battery and the second battery are unbalanced, a driving scenario comprising charging and/or discharging of at least one of the first battery and the second battery, the driving scenario balancing theg charge level of the first battery and the second battery prior to arriving at the predetermined and/or imminent charging event.

Moreover, the disclosed subject matter relates to an electric vehicle comprising a first electric motor coupled in driving relationship to one or more rear wheels of the electric vehicle and a second electric motor coupled in driving relationship to one or more front wheels of the electric vehicle, which electric vehicle comprises the dual battery system described herein.

Thereby, there is introduced an approach by which the batteries of a dual battery system may be balanced in terms of charge level by the time the electric vehicle stops to charge. This has the positive effect that charging may be initiated directly when arriving at a charging stop, without any further actions necessary in order to prepare the dual battery system for charging. In other words, the charge balancing of the batteries occurs while driving the vehicle, i.e. during propulsion of the vehicle. By obtaining information on an upcoming charging event, a balancing strategy which involves selecting an adapted driving scenario is provided, such that upon arrival at the charging event, the batteries of the dual battery system have been balanced in terms of charge, whereby charging may be initiated directly. Moreover, another positive effect of the method as recited above, resulting in balanced charge of the batteries of the dual battery system, is that full charging capability may be utilized, e.g. 400 V or 800 V charging voltage, since the batteries may be connected in parallel mode or series mode during charging.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
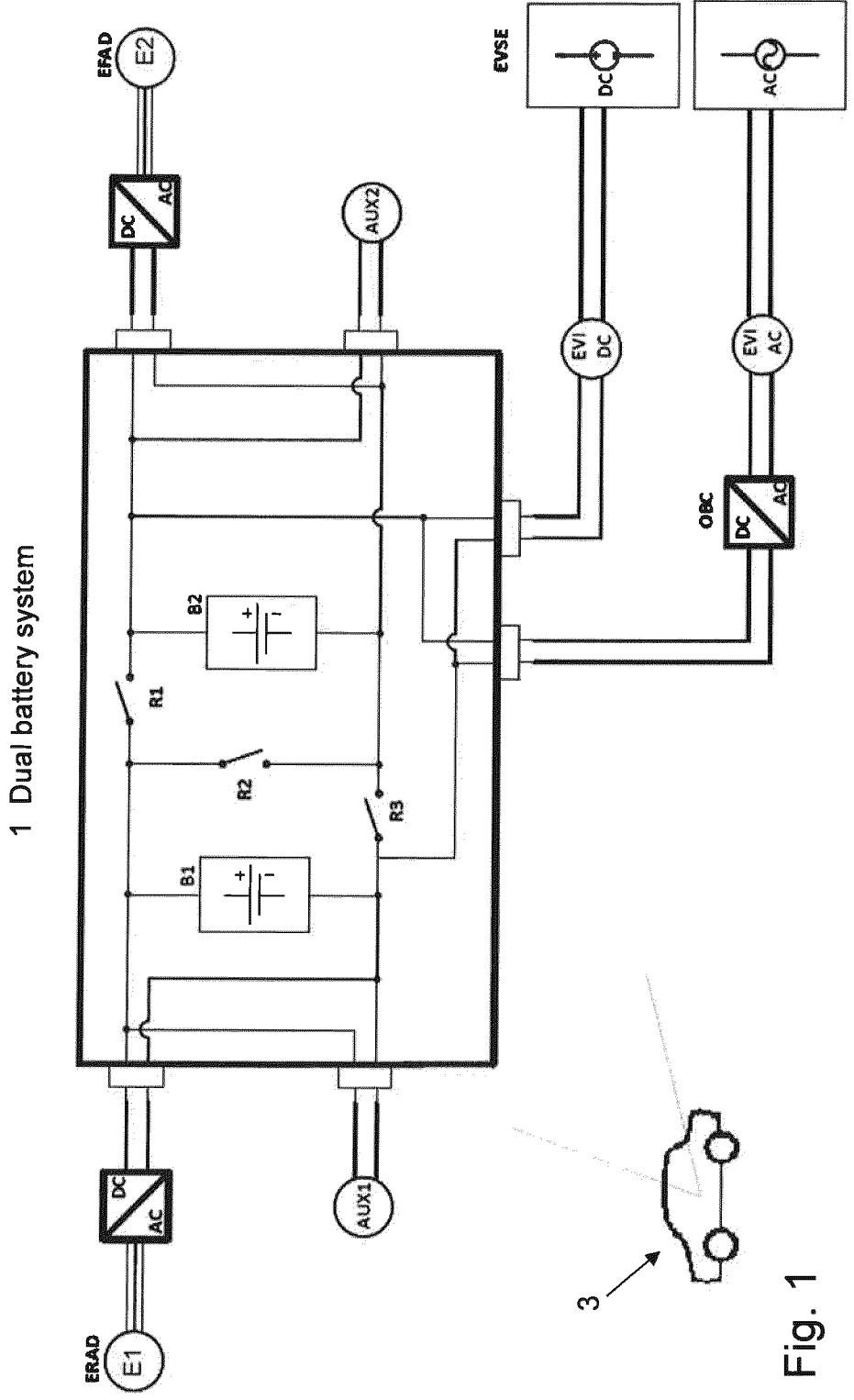
FIG. 1 illustrates a schematic view illustrating an exemplifying dual battery system according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout.

In the following, according to embodiments herein which relate to balancing a charge level of a first battery and a second battery of a dual battery system, there will be disclosed an approach according to which improved balancing strategies are provided.

Referring to FIG. 1, there is depicted a schematic view of an exemplifying dual battery system 1 according to embodiments of the disclosed subject matter. The dual battery system 1 is adapted for powering propulsion of an electric vehicle 3. The electric vehicle 3, which may comprise the dual battery system 1, may refer to any—e.g. known—electrically propelled vehicle, such as e.g. a passenger car. According to an example, the electric vehicle 3 may further potentially refer to an electric vehicle at least partly supporting autonomous driving. The expression "electric vehicle" may refer to "EV", "battery electric vehicle", "BEV", "electrically propelled vehicle" and/or "vehicle adapted to use one or more electric motors for propulsion".

The electric vehicle 3 comprises a first electric motor E1 coupled in driving relationship to one or more rear wheels (not shown) and a second electric motor E2 coupled in driving relationship to one or more front wheels (not shown). The dual battery system 1 comprises a first battery B1 and a second battery B2, where the first battery B1 is adapted to provide electric power for driving the first electric motor E1 and the second battery B2 adapted to provide electric power for driving the second electric motor E2. Thereby, the first battery B1 is configured to be used to power rear-wheel drive propulsion of an electric vehicle 3, whereas the second battery B2 is configured to be used to power front-wheel drive propulsion of said electric vehicle 3. Accordingly, the dual battery system 1 supports being utilized in connection with an electrical vehicle 3, with the first battery B1 in connection with—and/or connectable to—a first electric motor E1 of the electric vehicle 3 coupled in driving relationship to one or more rear wheel of said electric vehicle 3, and the second battery B2 in connection with—and/or connectable to—a second electric motor E2 of the electric vehicle 3 coupled in driving relationship to one or more front wheels of said electric vehicle 3. Thus, the first battery B1 supports powering rear-wheel drive propulsion of an electric vehicle 3, whereas the second battery B2 supports powering front-wheel drive propulsion of said electric vehicle 3. Consequently, the dual battery system 1 may support different driving situations, where either the first B1 or the second battery B2—or both—may be utilized. Furthermore, with the dual batteries B1, B2 rather than a single battery, an increased battery lifespan for an electric vehicle 3 is supported.

The first battery B1 may be connectable to the first electric motor E1 in any manner—e.g. known—deemed suitable for enabling providing power for driving the first electric motor E1. Correspondingly, the second battery B2 may be connectable to the second electric motor E2 in any manner—e.g. known—deemed suitable for enabling providing power for driving the second electric motor E2.

The expression the first/second battery is "adapted to provide" electric power may refer to the first/second battery is "adapted to support provision of" electric power, whereas the first/second battery is "adapted to provide electric power for driving" the first/second electric motor may refer to the first/second battery is "connectable and/or adapted to be connected to" the first/second electric motor.

Respective electric motor E1, E2 may refer to any—e.g. known—traction motor adapted to be used for propulsion of an electric vehicle 3. The first electric motor E1 may be connected to the one or more rear wheels in any known manner enabling and/or supporting the first electric motor E1 to drive the one or more rear wheels. Correspondingly, the second electric motor E2 may be connected to the one or more front wheels in any known manner enabling and/or supporting the second electric motor E2 to drive the one or more front wheels. The expression "a" first/second electric motor may refer to "at least a" first/second electric motor, whereas "electric motor" may refer to "traction motor", and further to "electric motor of the vehicle". Electric motor "coupled in driving relationship to" one or more rear/front wheels, on the other hand, may refer to electric motor "connected to" one or more rear/front wheels.

The first battery B1 and the second battery B2 may respectively refer to any—e.g. known—electric-vehicle battery adapted to give power over sustained periods of time, such as e.g. a lithium-ion, lithium-ion polymer, lithium titanate oxide, lithium cobalt oxide, lead-acid, nickel-cadmium, nickel-metal hydride, zink-air and/or molten-salt battery, and the first battery B1 may further differ from the second battery B2. The first battery B1 and the second battery B2 may further respectively comprise any number of commonly known cells (not shown), and/or modules comprising stacked cells, deemed feasible for the application at hand, and the number of cells for respective first and second battery may for instance range from a single cell up to hundreds of cells. A number of cells of the first battery B1 may differ from a number of cells of the second battery B2. Further, chemistry, size and/or physical shape of respective first B1 and second battery B2—and/or the cells comprised therein—may be selected as deemed suitable for the implementation at hand, and may potentially differ between the first B1 and second battery B2. The first B1 and second battery B2 may further respectively comprise any known components enabling the first B1 and second battery B2 to respectively support powering propulsion of an electric vehicle 3 over sustained periods of time. The expression "battery" may refer to "electric-vehicle battery", "traction battery", "rechargeable battery" and/or "secondary battery", and according to an example further to "deep-cycle battery". Moreover, "battery" may refer to "battery pack", "battery comprising one or more cells and/or electrochemical cells" and/or "battery comprising one or more modules respectively comprising and/or stacking one or more cells".

Figure 3:
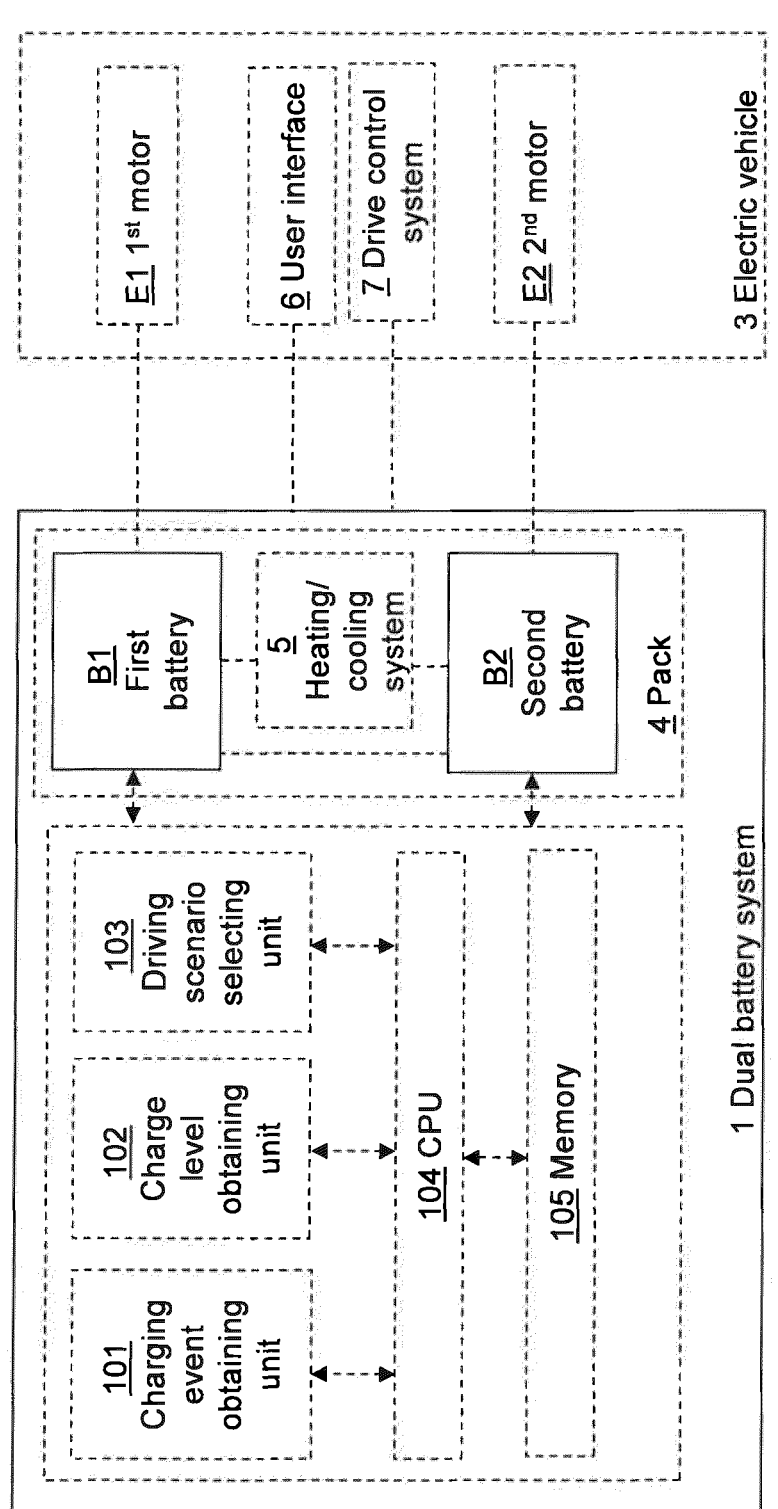
FIG. 3 illustrates a schematic block diagram of an exemplifying dual battery system according to embodiments of the disclosure.

According to an example, the first and second batteries B1, B2 may optionally be comprised in a common battery pack 4 (shown in FIG. 3). Said common battery pack 5 may have any feasible—e.g. known—geometry and/or characteristics deemed suitable for the application and/or restrictions at hand. Moreover, the dual battery system 1 may optionally comprise a heating and/or cooling system 5 (shown in FIG. 3) at least partly shared by the first battery B1 and the second battery B2. Said heating and/or cooling system 5 may refer to any—e.g. known—feasible battery heating and/or cooling system, and may further for instance comprise a heat pump, cooling plate and/or coolant.

In FIG. 1, AUX1 and AUX2 represent any number or type of auxiliary load, such as DCDC converters, AC compressors and/or heaters connected across the first battery B1 and the second battery B2 respectively. ERAD represents in an exemplifying manner electrical rear axle drive, whereas EFAD in an exemplifying manner represents electrical front axle drive. OBC, on other hand, represents an exemplifying on-board charger, whereas EVSE represents an exemplifying electric vehicle supply equipment e.g. charging station. Furthermore, for readability, internal contactors of the first battery B1 and the second battery B2, as well as redundant DC-charging-contactors, have been omitted.

The dual battery system 1 is adapted for and/or configured to obtain at least one of data and/or information of a predetermined and/or imminent charging event of the electric vehicle 3. Furthermore, the dual battery system 1 is adapted for and/or configured to obtain at least one of data and/or information of charge level of the first battery B1 and the second battery B2 respectively. Moreover, the dual battery system 1 is adapted for and/or configured to select, when the charge level of the first battery B1 and the second battery B2 are unbalanced, a driving scenario comprising charging and/or discharging of at least one of the first battery B1 and the second battery B2, the driving scenario balancing the charge level of the first battery B1 and the second battery B2 prior to arriving at the predetermined and/or imminent charging event.

That is, different strategies may be applied in order to solve or at least ameliorate balancing issues related to dual battery configurations, in particular related to charging events. It is desirable to provide balancing strategies that are effective in such a way that the charging time per see is not affected negatively. Desirably, a dual battery configuration is balanced prior to and/or imminent to arrival at a charging event such that charging may occur directly upon arrival to the charging station, without any further actions or activities.

Thus, it is desirable with an approach by which the first B1 and second battery B2 of the dual battery system 1 are balanced in terms of charge during driving of the electric vehicle 3 in such a way that upon stopping at the charging station, the batteries B1, B2 are balanced and in a state ready for charging.

That is, as exemplified in FIG. 1, the first battery B1 and the second battery B2 may be electrically connectable to one another via a switch arrangement R1, R2, R3. Subsequently, the selected driving scenario may be effected with support from the switch arrangement R1, R2, R3, the switch arrangement R1, R2, R3 being adapted for and/or configured to enable the first battery B1 and the second battery B2 to be electrically connectable to one another in parallel, electrically connectable to one another in series, and electrically disconnectable from one another. Hence, by means of the switch arrangement R1, R2, R3, the first battery B1 and the second battery B2 may be configured to be connectable in parallel or in series to one another, or to be disconnectable from one another, i.e. the first battery and second battery may be electrically disconnectable from one another. In this way, the dual battery system 1 as described herein may be adapted to support different driving scenarios and/or different charging voltages, which will be described in more detail below.

In an exemplifying parallel mode, the first battery B1 and the second battery B2 are electrically connected in parallel, e.g. by means of a switch arrangement R1, R2, R3 such as the exemplifying switch arrangement R1, R2, R3 depicted in FIG. 1 with e.g. R1 closed, R2 open and R3 closed. Hence, both batteries B1, B2 may be involved simultaneously for powering propulsion of the electric vehicle 3 if connected in parallel, such as e.g. during all-wheel-drive, AWD, of the electric vehicle 3. The first battery B1 and the second battery B2 automatically remain balanced in terms of charge level as long as they remain connected in parallel. Thereby, a driving scenario in which the first battery B1 and the second battery B2 are connected in parallel may support an approach for maintaining the charge level of the first battery B1 and the second battery B2 in balance in time for a charging event.

Furthermore, in an exemplifying disconnect mode, the first battery B1 and the second battery B2 are electrically disconnected from one another, e.g. by means of a switch arrangement R1, R2, R3 such as the exemplifying switch arrangement R1, R2, R3 depicted in FIG. 1 with e.g. all three of R1, R2 and R3 open. Hence, at least one of the first battery B1 and the second battery B2 may be involved for powering propulsion of the electric vehicle 3 if disconnected from one another, such as e.g. during front-wheel-drive, FWD, of the electric vehicle 3 or rear-wheel-drive, RWD, of the electric vehicle 3, which selectively involves the one of the first B1 or second battery B2 being adapted to provide electric power for driving the electric motor E1, E2 coupled in driving relationship to the one or more front wheels or one or more rear wheels respectively. Thereby, a driving scenario in which the first battery B1 and the second battery B2 are disconnected from one another may support an approach for balancing charge level of the first battery B1 and the second battery B2 respectively, by means of involving only one of the first B1 and second battery B2 for powering propulsion.

Moreover, in an exemplifying series mode, the first battery B1 and the second battery B2 are electrically connected in series, e.g. by means of a switch arrangement R1, R2, R3 such as the exemplifying switch arrangement R1, R2, R3 depicted in FIG. 1 with e.g. R1 open, R2 closed and R3 open. Hence, a series mode may be used as a charging mode, providing the possibility to charge the first battery B1 and the second battery B2 simultaneously at a higher charging voltage than when the first battery B1 and the second battery B2 are configured as in the previously discussed parallel mode or disconnect mode.

In this way, the disclosed subject matter supports an approach for which a charging event may be carried out at a first charging voltage and/or at a second charging voltage, the second charging voltage being higher than the first charging voltage, depending on the configuration mode of the dual battery system 1. Moreover, a dual battery system 1 as described herein is adapted to enable selective charging of one of the first battery B1 and the second battery B2 and/or simultaneous charging of the first and second batteries B1, B2 depending on the configuration mode of the dual battery system 1.

Independent of at which charging voltage, and hence in which configuration of the dual battery system 1 a charging event may occur, a balancing of the first battery B1 and the second battery B2 in terms of charge level is desirable and/or may be necessary prior to charging, in order to use the full charging capabilities and to fully charge the first battery B1 and the second battery B2 during a charging event.

Balancing of the charge level of the first battery B1 and the second battery B2 may be carried out during an arbitrary period of time, for instance ranging from less than a minute up to several minutes or even hours. Moreover, activation of the driving scenario may potentially take place at a later point in time than selection of said driving scenario; i.e. the driving scenario may be activated in a timely manner, for instance to meet a timing, remaining time and/or remaining distance to the charging event.

The phrase "at least one of data and information of" may refer to "data and information of", "data or information of", "input indicating" and/or "input data indicating". Moreover, the phrase "obtaining at least one of data or information of" a predetermined and/or imminent charging event may refer to "obtaining charging event input indicating" a predetermined and/or imminent charging event, whereas "obtaining at least one of data or information of charge level" may refer to "obtaining charge level input indicating charge level". "Charging event of the electric vehicle", on the other hand, may refer to "timing, remaining time and/or remaining distance—or estimated timing, remaining time and/or remaining distance—for the electric vehicle to reach an EVSE and/or charging station", whereas "charge level" may refer to "state of charge, SOC". "Obtaining" may throughout refer to "receiving" and/or "deriving", and according to an example further to "obtaining electronically".

The phrase "balancing" in terms of charge level, may refer to "equalizing" in terms of charge level, and charge levels being "substantially equal". The phrase "unbalanced" in terms of charge level may refer to charge levels "not being equal", being "substantially not equal", and/or being "unequal to a predeterminable extent". The phrase "when the charge level of the first battery and the second battery are unbalanced" may refer to "when the charge level of the first battery differs from the charge level of the second battery", "when the charge level of the first battery differs from the charge level of the second battery to a predetermined extent", "when it may be derived that the charge level of the first battery differs from the charge level of the second battery" and/or "should the charge level of the first battery differ from the charge level of the second battery". "Selecting" a driving scenario may refer to "selecting, based on the charging event input and the charge level input" a driving scenario, "selecting in a timely manner" a driving scenario and/or "selecting promptly and/or at a predeterminable point it time" a driving scenario, whereas "prior to arriving" may refer to "in time for arriving" and/or "just in time for arriving". "Arriving at" the charging event, on the other hand, may refer to "reaching" the charging event, whereas "the driving scenario balancing the charge level" may refer to "which driving scenario is adapted to balance the charge level".

Optionally, a driving scenario may comprise propelling the electric vehicle 3 by providing electric power solely from the one battery B1, B2 of the first battery B1 and the second battery B2 with highest charge level. Thereby, the one battery B1, B2 of the first battery B1 and the second battery B2 with highest charge level is discharged. In this way, the electric vehicle 3 may be driven either in FWD or RWD in order to reach a balanced charge level of the first battery B1 and the second battery B2. The driving scenario may for instance be effected by the disconnect mode discussed above.

Further optionally, a driving scenario may as an alternative or complement comprise charging of the one battery B1, B2 of the first battery B1 and the second battery B2 with lowest charge level, by means of regenerative braking of the one or more wheels coupled in driving relationship with the electric motor E1, E2 having an electric power transmission connection with the one battery B1, B2 with lowest charge level. Thereby, an approach is provided for reaching—and/or at least contributing to reaching—a balanced charge level of the first battery B1 and the second battery B2.

Moreover, optionally, a driving scenario may as an alternative or complement comprise using excessive power from the one battery B1, B2 of the first battery B1 and the second battery B2 with highest charge level, by applying an excessive torque on the one or more wheels in driving relationship with the electric motor E1, E2 powered by the one battery B1, B2 of the first battery B1 and the second battery B2 with highest charge level, while simultaneously charging the other battery B1, B2 of the first battery B1 and the second battery B2 using regenerative braking of the one or more wheels coupled in driving relationship with the electric motor E1, E2 powered by the other battery B1, B2. Thereby, an approach is provided for reaching—and/or at least contributing to reaching—a balanced charge level of the first battery B1 and the second battery B2.

Since the full capacity of the electric powertrain may not be needed for propelling the electric vehicle 3, energy may be transferred between the batteries B1, B2, in driving relationship with respective driving axle, i.e. the electric drives. In this way, energy may be transferred without affecting a velocity of the electric vehicle 3 set by a vehicle occupant or a drive control system 7 (shown in FIG. 3) of the electric vehicle 3. Thus, optionally, the selected driving scenario may allow a velocity of the electric vehicle 3 set by a vehicle occupant and/or by a drive control system 7 of the electric vehicle 3, to remain unaffected. The exemplifying drive control system 7 may e.g. refer to a driving assisting system of the electric vehicle 3, such as e.g. a cruise control system, adaptive cruise control system, automated driving system, and/or autonomous driving system etc. Moreover, the term "allows" may refer to "adapted to allow".

Optionally, the selected driving scenario may override any current AWD, RWD or FWD of the electric vehicle (3). Thereby, the selected driving scenario may take precedence over any previous and/or ongoing driving scenario, e.g. set by a vehicle occupant of the electric vehicle 3, and/or a drive control system 7 of the electric vehicle 3 such as the drive control system 7 discussed above.

Optionally, the at least one of data and information of a predetermined and/or imminent charging event may be obtained from a vehicle occupant of the electric vehicle 3, via a user interface 6 (shown in FIG. 3), and/or obtained from a drive control system 7 of the electric vehicle 3. Thereby, input to an upcoming charging event may be provided to the dual battery system 1 in a convenient manner. The exemplifying user interface 6 may refer to control means enabling a vehicle occupant to interact with the electric vehicle 3 and/or the dual battery system 1, for instance via a touch display, buttons, knobs, pedals and/or microphone etc., whereas the exemplifying drive control system 7 may refer to the previously described drive control system 7.

Figure 2:
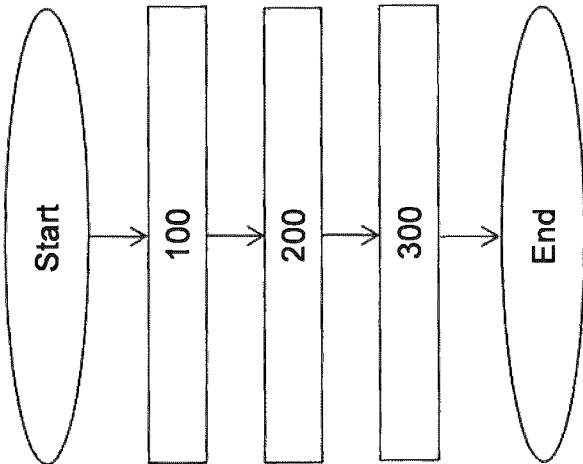
FIG. 2 is a flowchart depicting an exemplifying method for balancing charge level of a first battery and a second battery respectively according to embodiments of the disclosure.

Referring to FIG. 2, there is depicted a flowchart of an exemplifying method according to embodiments of the disclosure. The exemplifying method comprises the following action discussed with support from FIGS. 1 and 3. The method is performed by a dual battery system 1 comprising a first battery B1 and a second battery B2, for balancing a charge level of the first battery B1 and the second battery respectively B2. The dual battery system 1 is adapted for powering propulsion of an electric vehicle 3 comprising a first electric motor E1 coupled in driving relationship with one or more rear wheels of the electric vehicle 3 and a second electric motor E2 coupled in driving relationship with one or more front wheels of the electric vehicle 3. The first battery B1 is adapted to provide electric power for driving the first electric motor E1 and the second battery B2 is adapted to provide electric power for driving the second electric motor E2.

Action 100

In Action 100, the dual battery system 1 obtains—e.g. by means of an optional charging event obtaining unit 101 (shown in FIG. 3)—at least one of data or information of a predetermined and/or imminent charging event of the electric vehicle 3.

Action 200

In Action 200, the dual battery system 1 obtains—e.g. by means of an optional charge level obtaining unit 102 (shown in FIG. 3)—at least one of data or information of charge level of the first battery B1 and second battery B2 respectively.

Action 300

In Action 300, the dual battery system 1 selects—e.g. by means of an optional driving scenario selecting unit 103 (shown in FIG. 3)—when the charge level of the first battery B1 and the second battery B2 are unbalanced, a driving scenario which comprises charging and/or discharging of at least one of the first battery B1 and the second battery B2, the driving scenario balancing the charge level of the first battery B1 and the second battery B2 prior to arriving at the predetermined and/or imminent charging event.

As further shown in FIG. 3, which depicts a schematic block diagram illustrating an exemplifying dual battery system 1 according to embodiments of the disclosure, the dual battery system 1 may comprise the optional charging event obtaining unit 101, the optional charge level obtaining unit 102 and the optional driving scenario selecting unit 103. Furthermore, embodiments herein for balancing charge level of the first battery B1 and the second battery B2 may at least partly be implemented through one or more processors, such as a processor 104, here denoted Central Processing Unit (CPU), together with computer program code for performing the functions and actions of embodiments herein. Said program code may also be provided as a computer program product, for instance in the form of a data carrier carrying computer program code for performing the embodiments herein when being loaded into the dual battery system 1. One such carrier may be in the form of a CD ROM disc or DVD, it is however feasible with other data carriers. The computer program code may furthermore be provided as pure program code on a server and downloaded to the dual battery system 1. The dual battery system 1 may further comprise a memory 105 comprising one or more memory units. The memory 105 may be arranged to be used to store e.g. information, and further to store data, configurations, schedulings, and applications, to perform the methods herein when being executed in the dual battery system 1. Those skilled in the art will also appreciate that said units 101, 102, 103 may refer to a combination of analog and digital circuits, and/or one or more processors configured with software and/or firmware, e.g. stored in a memory such as the memory 104, that when executed by the one or more processors such as the processor 104 perform as described herein. One or more of these processors, as well as the other digital hardware, may be included in a single ASIC (Application-Specific Integrated Circuitry), or several processors and various digital hardware may be distributed among several separate components, whether individually packaged or assembled into a SoC (System-on-a-Chip).

Further shown in FIG. 3 is the first battery B1, the second battery B2, the optional common battery pack 4, the optional heating and/or cooling system 5, as well as the electric vehicle 3, the optional first and second motors E1, E2, the optional user interface 6, and the optional drive control system 7.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

Various examples have been described. These and other examples are within the scope of the following claims.

The invention claimed is:

1. A method performed by a dual battery system comprising a first battery and a second battery, for balancing charge level of the first battery and the second battery, the dual battery system being adapted for powering propulsion of an electric vehicle comprising a first electric motor coupled in driving relationship with one or more rear wheels of the electric vehicle and a second electric motor coupled in driving relationship with one or more front wheels of the electric vehicle, the first battery being adapted to provide electric power for driving the first electric motor and the second battery being adapted to provide electric power for driving the second electric motor, the method comprising:

obtaining at least one of data or information of a predetermined or imminent charging event of the electric vehicle referring to at least one of: an estimated timing, a remaining time, or a remaining distance for the electric vehicle to reach at least one of: an electric vehicle supply equipment (EVSE) or a charging station, obtaining at least one of data or information of charge level of the first battery and second battery respectively, and selecting, when the charge level of the first battery and the second battery are unbalanced, a driving scenario which comprises charging or discharging of at least one of the first battery and the second battery, the driving scenario balancing the charge level of the first battery and the second battery prior to arriving at the predetermined and/or imminent charging event.

2. The method according to claim 1, wherein the driving scenario comprises propelling the electric vehicle by providing electric power solely from one battery of the first battery and the second battery with a highest charge level.

3. The method according to claim 1, wherein the driving scenario comprises charging of one battery of the first battery and the second battery with lowest charge level by means of regenerative braking of at least one of the one or more front wheels or the one or more rear wheels respectively coupled in driving relationship with the first electric motor and the second electric motor, wherein at least one of the first electric motor and the second electric motor comprises having an electric power transmission connection with the one battery with the lowest charge level.

4. The method according to claim 1, wherein the driving scenario comprises using excessive power from one battery of the first and second battery with a highest charge level by applying an excessive torque on at least one of the one or more front wheels and the one or more rear wheels respectively coupled in driving relationship with the first electric motor and the second electric motor, wherein at least one of the first electric motor and the second electric motor is powered by the one battery with highest charge level while simultaneously charging another battery of the first and second battery using regenerative braking of the at least one of the one or more front wheels and the one or more rear wheels respectively coupled in driving relationship with the first electric motor and the second electric motor powered by another battery of the first and second battery.

5. The method according to claim 4, wherein the driving scenario allows a velocity of the electric vehicle set by a vehicle occupant and/or by a drive control system of the electric vehicle, to remain unaffected.

6. The method according to claim 1, wherein the driving scenario overrides any current all-wheel drive, AWD, rear-wheel drive, RWD, or front-wheel drive, FWD, of the electric vehicle.

7. The method according to claim 1, wherein the data or information of the predetermined and/or imminent charging event is obtained from a vehicle occupant of the electric vehicle, via a user interface, and/or obtained from a drive control system of the electric vehicle.

8. A dual battery system comprising a first battery and a second battery, for balancing charge level of the first battery and the second battery, the dual battery system being adapted for powering propulsion of an electric vehicle comprising a first electric motor coupled in driving relationship with one or more rear wheels of a second electric motor coupled in driving relationship with one or more front wheels of the electric vehicle, the first battery being adapted to provide electric power for driving the first electric motor and the second battery being adapted to provide electric power for driving the second electric motor, the dual battery system being adapted to:

obtain at least one of data and/or information of a predetermined and/or imminent charging event of the electric vehicle referring to at least one of: an estimated timing, a remaining time, or a remaining distance for the electric vehicle to reach at least one of: an electric vehicle supply equipment (EVSE) or a charging station, obtain at least one of data and/or information of charge level of the first battery and the second battery respectively, and select, when the charge level of the first battery and the second battery are unbalanced, a driving scenario comprising charging and/or discharging of at least one of the first battery and the second battery, the driving scenario balancing the charge level of the first battery and the second battery prior to arriving at the predetermined and/or imminent charging event.

9. The dual battery system according to claim 8, wherein the driving scenario comprises propelling the electric vehicle by providing electric power solely from one battery of the first battery and the second battery with a highest charge level.

10. The dual battery system according to claim 8, wherein the driving scenario comprises charging of one battery of the first battery and the second battery with a lowest charge level by means of regenerative braking of at least one of the one or more front wheels or the one or more rear wheels respectively coupled in driving relationship with the first electric motor and the second electric motor, wherein at least one of the first electric motor and the second electric motor comprises an electric power transmission connection with the one battery with the lowest charge level.

11. The dual battery system according to claims 8, wherein the driving scenario comprises using excessive power from one battery of the first and second battery with a highest charge level by applying an excessive torque on at least one of the one or more front wheels and the one or more rear wheels respectively coupled in driving relationship with the first electric motor and the second electric motor, wherein at least one of the first electric motor and the second electric motor is powered by the one battery with highest charge level while simultaneously charging another battery of the first and second battery using regenerative braking of the at least one of the one or more front wheels and the one or more rear wheels respectively coupled in driving relationship with the first electric motor and the second electric motor powered by another battery of the first and second battery.

12. The dual battery system according to claim 11, wherein the driving scenario allows a velocity of the electric vehicle set by a vehicle occupant and/or a drive control system of the electric vehicle, to remain unaffected.

13. The dual battery system according to claim 8, wherein the driving scenario overrides any current all-wheel drive, AWD, rear-wheel drive, RWD, or front-wheel drive, FWD, of the electric vehicle.

14. The dual battery system according to claim 8, wherein the data or information of the predetermined and/or imminent charging event is obtained from a vehicle occupant of the electric vehicle, via a user interface, and/or obtained from a drive control system of the electric vehicle.

15. The electric vehicle comprising the first electric motor coupled in driving relationship to one or more rear wheels of the electric vehicle and the second electric motor coupled in driving relationship to one or more front wheels of the electric vehicle, the electric vehicle comprising the dual battery system according to claim 8.

16. A method performed by a dual battery system comprising a first battery and a second battery, for balancing charge level of the first battery and the second battery, the dual battery system being adapted for powering propulsion of an electric vehicle comprising a first electric motor coupled in driving relationship with one or more rear wheels of the electric vehicle and a second electric motor coupled in driving relationship with one or more front wheels of the electric vehicle, the first battery being adapted to provide electric power for driving the first electric motor and the second battery being adapted to provide electric power for driving the second electric motor, the method comprising:

obtaining at least one of data or information of a predetermined and/or imminent charging event of the electric vehicle referring to at least one of: an estimated timing, a remaining time, or a remaining distance for the electric vehicle to reach at least one of: an electric vehicle supply equipment (EVSE) or a charging station, obtaining at least one of data or information of charge level of the first battery and second battery respectively, and selecting, when the charge level of the first battery and the second battery are unbalanced, a driving scenario which comprises charging and/or discharging of at least one of the first battery and the second battery, the driving scenario balancing the charge level of the first battery and the second battery prior to arriving at the predetermined and/or imminent charging event.

17. The method according to claim 16, wherein the driving scenario comprises propelling the electric vehicle by providing electric power solely from one battery of the first battery and the second battery with a highest charge level.

18. The method according to claim 16, wherein the driving scenario comprises charging of one battery of the first battery and the second battery with a lowest charge level by means of regenerative braking of at least one of the one or more front wheels or the one or more rear wheels respectively coupled in driving relationship with the first electric motor and the second electric motor, wherein at least one of the first electric motor and the second electric motor comprises an electric power transmission connection with the one battery with the lowest charge level.

19. The method according to claim 16, wherein the driving scenario comprises using excessive power from one battery of the first and second battery with a highest charge level by applying an excessive torque on at least one of the one or more front wheels and the one or more rear wheels respectively coupled in driving relationship with the first electric motor and the second electric motor, wherein at least one of the first electric motor and the second electric motor is powered by the one battery with highest charge level while simultaneously charging another battery of the first and second battery using regenerative braking of the at least one of the one or more front wheels and the one or more rear wheels respectively coupled in driving relationship with the first electric motor and the second electric motor powered by another battery of the first and second battery.

20. The method according to claim 19, wherein the driving scenario allows a velocity of the electric vehicle set by a vehicle occupant and/or by a drive control system of the electric vehicle, to remain unaffected.

* * * * *